United States Patent [19]

Saam

[11] 4,244,849

[45] Jan. 13, 1981

[54] SILICONE EMULSION WHICH PROVIDES AN ELASTOMERIC PRODUCT AND METHODS FOR PREPARATION

[75] Inventor: John C. Saam, Midland, Mich.

[73] Assignee: Dow Corning Corporation, Midland, Mich.

[21] Appl. No.: 64,152

[22] Filed: Aug. 6, 1979

[51] Int. Cl.$^3$ .............................................. C08L 83/10

[52] U.S. Cl. ......................... 260/29.2 M; 260/37 SB; 428/447; 428/451

[58] Field of Search .................. 260/29.2 M; 525/477, 525/478, 475, 902; 106/287.13–287.16

[56] References Cited

U.S. PATENT DOCUMENTS

| | | | |
|---|---|---|---|
| 3,294,725 | 12/1966 | Findlay et al. | 260/29.2 M |
| 3,355,406 | 11/1967 | Cekada | 260/29.2 |
| 3,624,017 | 11/1971 | Sorkin | 260/29.2 M |
| 3,706,695 | 12/1972 | Huebner et al. | 117/226 |

FOREIGN PATENT DOCUMENTS

| | | | |
|---|---|---|---|
| 862183 | 1/1971 | Canada | 260/29.2 |
| 53-130752 | 11/1978 | Japan . | |

*Primary Examiner*—Theodore E. Pertilla

*Attorney, Agent, or Firm*—James E. Bittell

[57] ABSTRACT

An aqueous silicone emulsion is described which provides an elastomeric product upon removal of the water under ambient conditions. The emulsion comprises a continuous water phase and an anionically stabilized dispersed silicone phase which is a graft copolymer of a hydroxyl endblocked polydiorganosiloxane and an alkali metal silicate. The emulsion is formed and maintained in a stable condition by control of the pH within the range of 8.5 to 12 inclusive. In the method of preparing the emulsion, an organic tin compound can be employed to accelerate the formation of the graft copolymer.

19 Claims, No Drawings

SILICONE EMULSION WHICH PROVIDES AN ELASTOMERIC PRODUCT AND METHODS FOR PREPARATION

BACKGROUND OF THE INVENTION

This invention relates to an aqueous silicone emulsion which provides an elastomeric product and to methods of preparation of such emulsions.

Emulsions of organopolysiloxanes have been known for many years and have been suggested for depositing both plastic and elastomeric silicone coatings. Such emulsion coating systems are especially desirable because of the absence of organic solvent which reduces toxicity, pollution and fire hazards. However, commercial utilization of silicone emulsion coating systems has been delayed by problems such as emulsion stability and cure system stability.

Findlay et al. in U.S. Pat. No. 3,294,725 describe one approach to a silicone emulsion coating system which employs a copolymer of diorganosiloxane units and monoorganosiloxane units. The copolymer is prepared by anionic emulsion polymerization with a surface active sulfonic acid catalyst. Findlay et al. teach that the copolymer containing pendant and terminal silanol functionality does not appear to be gelled in the emulsion, but when removed from the emulsion, the copolymer gels to a crosslinked rubber upon heating. It is taught that fillers can be added to the emulsion to improve the strength of the rubber obtained from the emulsion. For maximum stability of the emulsion according to Findlay et al, it is desirable to neutralize the acid catalyst with a base to a pH of approximately 7. The emulsion is described as quite stable.

Cekada in U.S. Pat. No. 3,355,406 describes another approach to a silicone emulsion coating system employing essentially linear hydroxyl endblocked polydialkylsiloxane. An emulsion of the polydialkylsiloxane is combined with a silsesquioxane in the form of a colloidal suspension or gel and with a crosslinking agent such as methyltrimethoxysilane. When a condensation catalyst such as dibutyltin dilaurate is added, the emulsion will form a silicone rubber film when the water is evaporated at room temperature. Cekada also suggests that a peroxide catalyst could be used instead of the condensation catalyst to obtain an emulsion which upon removal of water would deposit a silicone film which could then be cured to a rubber by applying heat. Cekada further suggests that without any catalyst a deposited film might be converted to a rubber by irradiation. Cekada shows neutral emulsions, except for one example in which the emulsion was acidic. In the present invention, a neutral emulsion is not stable on storage and does not cure to an elastomer after storage.

Huebner et al. in U.S. Pat. No. 3,706,695 describes a silicone emulsion system similar to Cekada's except that carbon black is employed instead of the silsesquioxane for reinforcement. The use of carbon black also makes the rubber product electrically conductive. Huebner et al. further teach that the emulsion containing both the organometallic condensation catalyst and the monoalkyltrialkoxysilane crosslinking agent will cure to a useful silicone rubber up to two weeks or more, but after longer storage will not cure satisfactorily. Although the cure could be regenerated by adding additional catalyst and crosslinking agent, it was recommended for purposes of storage that the emulsion be contained in two or more packages.

Nelson in Canadian Pat. No. 862,183 describes a silicone emulsion for treating fiberglass. The emulsion is similar to the Cekada or Huebner et al. systems but does not contain a reinforcing filler. It consists essentially of an emulsion of hydroxyl endblocked polydimethylsiloxane, a crosslinking silane such as an alkyltrialkoxysilane or an alkylorthosilicate, and a siloxane condensation catalyst. The emulsion must be heated to cure it on the fiberglass. Nelson also teaches that it is preferred to keep the condensation catalyst separate from the remaining emulsion by using a two bath system for treating the fiberglass. As in Cekada, Nelson shows only neutral or acidic emulsions.

Sorkin in U.S. Pat. No. 3,624,017 discloses a silicone emulsion system that rapidly cures on substrates at elevated temperatures to give a release coating. Sorkin employs an anionic emulsion polymerized copolymer similar to the copolymer employed by Findlay et al. (i.e. containing both diorganosiloxane units and monoorganosiloxane units) except that the ratio of monoorganosiloxane to diorganosiloxane units is higher. In addition, an organometallic curing catalyst such as dibutyltin dilaurate was included to effect the fast cure of the copolymer on the substrate.

A silicone emulsion system is also described in copending U.S. patent application Ser. No. 901,052, filed 4-28-79 and assigned to the same assignee as the present patent application. The emulsion system employs an anionically stabilized hydroxylated polydiorganosiloxane combined with a colloidal silica with the pH adjusted within the range 9 to 11.5. The resulting silicone emulsion does not provide a cured elastomeric product when the water is allowed to evaporate at ambient conditions immediately after the emulsion is prepared. However, if this silicone emulsion is aged at room temperature for an extended storage period such as five months, it does provide cured elastomeric products when the water is removed. It is further taught that this required storage period can be reduced to one to three days if a diorganotindicarboxylate is added to the emulsion. The presence of colloidal silica is required for a useful cure either with or without the diorganotindicarboxylate.

While this last system provides excellent elastomeric coatings suitable for a number of applications, it does require the presence of relatively expensive colloidal silica. It is one of the objects of the present invention to provide a silicone emulsion system which deposits an elastomeric product upon removal of the water under ambient conditions without the use of colloidal silica. It is also an object of the present invention to provide a silicone emulsion system in which the emulsion and the cure system are stable upon extended storgae in one package. These and other objects of the invention will be apparent to one skilled in the art upon consideration of the following description and appended claims.

SUMMARY OF THE INVENTION

This invention relates to an aqueous silicone emulsion which provides an elastomeric product upon removal of the water under ambient conditions comprising a continuous water phase and an anionically stabilized dispersed silicone phase free of colloidal silica, the silicone phase comprising a graft copolymer of a water soluble silicate and a hydroxyl endblocked polydiorganosiloxane, the silicone emulsion having a pH within the range from 8.5 to 12 inclusive. Further, the invention relates to a method of preparing such an emulsion and to the emulsion comprising a continuous water phase and a dispersed silicone phase free of colloidal silica prepared by (A) adding water soluble silicate to anionically stabilized aqueous emulsion of hydroxyl endblocked polydiorganosiloxane, (B) adjusting the pH of the emulsion within the range from 8.5 to 12 inclusive and (C) then aging the emulsion at the pH of 8.5 to 12 for a time period such that an elastomeric product is formed upon removal of the water under ambient conditions.

DESCRIPTION OF THE INVENTION

The compositions of this invention are obtained from the interaction under certain conditions of hydroxyl endblocked polydiorganosiloxanes and alkali metal silicates. The products of this interaction are graft copolymers which are anionically stabilized in aqueous emulsions at a pH of 8.5 to 12. The exact structure of the graft copolymer particles in emulsion is not known, but they appear to be crosslinked gels because when the copolymer is quickly removed from the emulsion by freezing or precipitation, the polymer obtained has a high gel or insoluble fraction.

These silicone emulsions have unique utility because they can form elastomeric products by removal of the water under ambient conditions. For example when the silicone emulsion is spread out to form a coating, the water evaporates to leave a continuous cured silicone rubber which will not redisperse or dissolve significantly in water or organic solvents that commonly dissolve silicones.

The hydroxyl endblocked polydiorganosiloxanes useful for this invention are those which can be emulsified and which will impart elastomeric properties to the product obtained. The term "hydroxyl endblocked polydiorganosiloxane" is understood to describe an essentially linear polymer of repeating diorganosiloxane units containing no more than small impurities of monoorganosiloxane units. The hydroxyl endblocked diorganosiloxane will therefore have essentially two silicon-bonded hydroxyl radicals per molecule. To impart elastomer properties to the product obtained after removal of the water from the emulsion, the polysiloxane should have a weight average molecular weight ($M_w$) of at least 5,000. Polysiloxanes with low ($M_w$) do not provide strong elastomeric products, but are useful for certain coating applications. Tensile strengths and elongations at break improve with increasing molecular weight with reasonable tensile strengths and elongations obtained above 30,000 $M_w$ and the best tensile strengths and elongations obtained above 50,000 $M_w$. The maximum $M_w$ is one which can be emulsified and which will give elastomeric properties to the product obtained after the water is removed from the emulsion. Weight average molecular weights up to about 1,000,000 for the polysiloxane are expected to be practical for this invention. The preferred $M_w$ for the hydroxyl endblocked polydiorganosiloxane is in the range of 200,000 to 700,000.

The organic radicals of the hydroxyl endblocked polydiorganosiloxane can be monovalent hydrocarbon radicals containing less than seven carbon atoms per radical and 2-(perfluoroalkyl)ethyl radicals containing less than seven carbon atoms per radical. Examples of monovalent hydrocarbon radicals include methyl, ethyl, propyl, butyl, isopropyl, pentyl, hexyl, vinyl, cyclohexyl and phenyl and examples of 2-(perfluoroalkyl)ethyl radicals include 3,3,3-trifluoropropyl and 2-(perfluorobutyl)ethyl. The hydroxyl endblocked polydiorganosiloxanes preferably contain organic radicals in which at least 50 percent are methyl. The preferred polydiorganosiloxanes are the hydroxyl endblocked polydimethylsiloxanes.

In the procedure for preparing the silicone emulsions of the present invention, the hydroxyl endblocked polydiorganosiloxane is employed as an anionically stabilized aqueous emulsion. For the purposes of this invention "anionically stabilized" means the polydiorganosiloxane is stabilized in emulsion with an anionic surfactant. The most preferred anionically stabilized aqueous emulsion of hydroxyl endblocked polydiorganosiloxane are those prepared by the method of anionic emulsion polymerization described by Findlay et al. in U.S. Pat. No. 3,294,725 which is hereby incorporated by reference to show the methods of polymerization and to show the anionically stabilized emulsion of hydroxyl endblocked polydiorganosiloxane. Another method of preparing hydroxyl endblocked polydiorganosiloxane is described by Hyde et al. in U.S. Pat. No. 2,891,920 which is hereby incorporated by reference to show the hydroxyl endblocked polydiorganosiloxanes and their method of preparation. These methods and others are known in the art.

Alkali metal silicate is a required ingredient for the preparation of the emulsions of this invention. The alkali metal silicates that are suitable for use in the emulsions of the present invention are water soluble silicates. The alkali metal silicate is preferably employed as an aqueous solution. Aqueous silicate solutions of any of the alkali metals can be employed such as lithium silicate, sodium silicate, potassium silicate, rubidium silicate and cesium silicate.

Aqueous solutions of sodium or potassium silicate are well known and are commercially available. The solutions generally do not contain any significant amount of discrete particles of amorphous silica and are commonly referred to as water glass. The ratio by weight of $SiO_2$ to alkali metal oxide in the aqueous solutions of alkali metal silicates is not critical and may be varied within the usual range of about 1.5 to 3.5 for the sodium silicates and 2.1 to 2.5 for the potassium silicates. The aqueous alkali metal silicate solutions are particularly useful in preparing the emulsions of the present invention because the addition of the silicate solution often brings the pH of the emulsion within the required range of 8.5 to 12 so that additional ingredients are not necessary to adjust the pH of the emulsion. Of course, other aqueous alkali metal silicate solutions such as those prepared by hydrolyzing silicon esters in aqueous alkali metal hydroxide solutions can also be employed in the present invention.

The emulsions of the present invention are prepared by combining the aqueous solution of alkali metal silicate and polydiorganosiloxane in an emulsion so that graft copolymer is formed as dispersed particles. The preferred procedure for preparing silicone emulsions is to add the alkali metal silicate to an anionically stabilized aqueous emulsion of hydroxyl endblocked polydiorganosiloxane, adjust the pH of the emulsion within the range from 8.5 to 12 inclusive, and then age the emulsion for a time period such that an elastomeric product is formed upon removal of the water under ambient conditions. In this procedure, the pH of the emulsion containing dissolved silicate and dispersed hydroxyl endblocked polydiorganosiloxane is critical to the formation of the emulsions of this invention. A pH within the stated range is required to maintain the alkali metal silicate dissolved so that sufficient graft copolymerization between the dissolved silicate and dispersed siloxane occurs to produce the emulsions of this invention. If the pH is lower than the stated range, silicic acid is formed from the alkali metal silicate. Silicic acid is unstable and rapidly polymerizes by condensation which can gel the emulsion. Since silicic acid formation is almost completely surpressed at a pH of 10 to 12 and the reaction between dissolved alkali metal silicate and dispersed siloxanes occurs more rapidly within the pH range of 10–12, this pH range is preferred for the emulsions of this invention.

The pH of the silicone emulsion prepared as described herein can be adjusted within the defined range by any of a number of methods, such as with a basic compound or an ion exchange means, such as an ion exchange resin. The preferred method is to employ a basic compound, such as an organic amine, an alkali metal hydroxide or a combination thereof. The organic amines can be primary, secondary or tertiary amines which contain carbon, hydrogen and nitrogen, and can also contain oxygen, and which are water soluble in the amounts required. These organic amines include diethylamine, ethylenediamine, butylamine, hexylamine, morpholine, monoethanolamine, triethylamine and triethanolamine. The alkali metal hydroxides include sodium hydroxide, potassium hydroxide, lithium hydroxide, rubidium hydroxide and cesium hydroxide. The preferred alkali metal hydroxide is sodium hydroxide. The organic amines can be added neat or in aqueous solution. The alkali metal hydroxides are preferably added as an aqueous solution.

It should be noted that the addition of preferred alkali metal silicate solutions to the anionically stabilized hydroxyl endblocked polydiorganosiloxane can directly result in a pH within the required range for the emulsion. Thus, a separate step of adjusting the pH is not needed. In other words the mixing of the siloxane and sodium silicate can encompass the step of adjusting the pH. For the purpose of this invention, the term "pH" means the electrical potential measured on commercially available glass electrodes designed for this purpose when the glass electrode is immersed in the emulsion. The electrical potential is read from a scale on a commercial instrument in terms of the negative $\log_{10}$ of hydrogen ion activity. The electrode is calibrated with a standard buffer solution which gives a pH of 10.

Silicone emulsions prepared by this method must be aged within the defined pH range for a time period sufficient to allow interaction between the dissolved silicate and the dispersed siloxane so that an elastomeric product is formed upon removal of the water under ambient conditions. Even in the preferred pH range of 10 to 12, the interaction of dissolved silicate and dispersed siloxane is slow so that an extended period such as several months at room temperature is required. Since such extended periods are inconvenient in commercial production, it is preferred to reduce the aging period required by adding an organic tin salt preferably a diorganotin dicarboxylate, to the emulsion. Only 2 or 3 days aging is normally required when a preferred organic tin salt is employed at the preferred pH range.

The aging period is effectively reduced when an organic tin salt is employed in an amount of about 0.1 to 2 parts by weight for each 100 parts by weight polydiorganosiloxane. The organic tin salts expected to be useful in the emulsions include mono-, di- and triorganotin salts. The anion of the tin salt employed is not critical and can be either organic or inorganic although organic anions such as carboxylates are generally preferred. Organic tin salts that can be employed include octyltin triacetate, dioctyltin dioctoate, didecyltin diacetate, dibutyltin diacetate, dibutyltin dibromide, dioctyltin dilaurate and trioctyltin acetate. The preferred diorganotin dicarboxylate is dioctyltin dilaurate.

The concentration of the hydroxyl endblocked polydiorganosiloxane in the anionically stabilized emulsion is not critical, however, for convenience one should use a concentration which is in line with the concentration of the dispersed phase desired in the final silicone emulsion. The alkali metal silicate is most conveniently added to the emulsion as an aqueous solution. The concentration of the aqueous silicate solution employed is also not critical, but again, for convenience one should use a concentration which is in line with the concentration of the dispersed phase desired in the final silicone emulsion.

The relative amounts of alkali metal silicates and hydroxyl endblocked polydiorganosiloxane employed can vary over a considerable range. It has been found, however, that preferred elastomer properties are obtained when 0.3 to 30 parts by weight silicate is employed for each 100 parts by weight siloxane.

The silicone emulsions of this invention can contain the ingredients in a broad range of concentrations. The preferred concentration range will depend on the specific application and the thickness or amount of elastomeric product desired. For example, to provide a thick elastomeric protective coating ($\sim$0.5 mm thick) that doesn't form cracks as the water evaporates, it is best to use a silicone emulsion in which the combined amount of silicate and polydiorganosiloxane is 67 to 160 parts by weight for each 100 parts by weight of water.

One of the advantages of the present invention is the relatively small amount of surfactant or emulsifying agent needed to maintain a stable emulsion. The amount of anionic emulsifying agent can be less than 2 weight percent of the emulsion, wherein this amount can result from the neutralized sulfonic acid wherein the sulfonic acid is used in the emulsion polymerization method for the preparation of the hydroxyl endblocked polydiorganosiloxane.

Anionic surfactants are preferably the salt of the surface active sulfonic acids used in the emulsion polymerization to form the hydroxyl endblocked polydiorganosiloxane as shown in U.S. Pat. No. 3,294,725 cited above which is hereby incorporated by reference to show the surface active sulfonic acids and salts thereof. The alkali metal salts of the sulfonic acids are preferred, particularly the sodium salts. The sulfonic acid can be illustrated by aliphatically substituted benzenesulfonic acids, aliphatically substituted naphthalene sulfonic acids, aliphatic sulfonic acids, silylalkylsulfonic acids and aliphatically substituted diphenylethersulfonic acids. Other anionic emulsifying agents can be used, for example, alkali metal sulforicinoleates, sulfonated glyceryl esters of fatty acids, salts of sulfonated monovalent alcohol esters, amides of amino sulfonic acid such as the sodium salt of oleyl methyltauride, sulfonated aromatic hydrocarbon alkali salts such as sodium alpha-naphthalene monosulfonate, condensation products of naphthalene sulfonic acids with formaldehyde, and sulfates such as ammonium lauryl sulfate, triethanol amine lauryl sulfate and sodium lauryl ether sulfate.

Although not specifically required in the present invention, one can optionally include nonionic emulsifying agents in addition to the anionic emulsifying agents. Such nonionic emulsifying agents can be illustrated by saponins, condensation products of fatty acids with ethylene oxide such as dodecyl ether of tetraethylene oxide, condensation products of ethylene oxide and sorbitan trioleate, condensation products of phenolic compounds having side chains with ethylene oxide such as condensation products of ethylene oxide with isododecylphenol, and imine derivatives such as polymerized ethylene imine.

The silicone emulsions of the present invention may contain additional ingredients to modify the properties of the emulsions or the elastomeric products obtained from the emulsion. For example, a thickener may be added to modify viscosity of the emulsion or to provide thixotropy for the emulsion. Also an antifoam may be added to reduce foaming during preparation or use.

Another useful ingredient for addition to the silicone emulsion is a filler other than colloidal silica. Such fillers may be added to reinforce, extend or pigment the elastomeric product. Useful fillers include carbon black, clay, alumina, calcium carbonate, quartz, zinc oxide, mica, titanium dioxide and others well known in the art.

The silicone emulsions can be used to form elastomeric products and coatings on substrates by removal of the water under ambient conditions. When these silicone emulsions are spread out to form coatings, the water evaporates to leave a cured silicone elastomer. Evaporation of the water is usually complete within a few hours to about one day depending on the film thickness and method of application. Another of the important advantages of the present invention is the excellent adhesion shown by these elastomeric coatings for both polar and non-polar substrates. While the reason for this adhesion to both polar and non-polar substrates is not completely clear, it is believed to result from the dual characteristic of the graft copolymer containing both polar silicate portions and non-polar diorganosiloxane portions. It is believed that the polar portions of the copolymer may preferentially orient to polar surfaces to provide adhesion in that case while the non-polar portions of the copolymer may likewise preferentially orient to non-polar surfaces to provide adhesion to those surfaces.

It should be understood that this invention is not limited to removal of water by evaporation, other methods such as coagulation may be useful. It is also expected that heating the silicone emulsions to more rapidly remove water to produce elastomeric products could be useful.

The following examples are presented for purposes of illustrating the invention and should not be construed as limiting the scope of the invention which is properly delineated in the claims.

EXAMPLE 1

A silicone emulsion was prepared by adding 139 g. of an aqueous sodium silicate solution having a weight ratio of $SiO_2/Na_2O$ of 2.00 and having 44.1 weight percent solids (Sodium Silicate A) to 2.0 Kg of an aqueous emulsion containing about 47 weight percent emulsion polymerized hydroxyl endblocked polydimethylsiloxane having a weight average molecular weight of about 277,000 (Polymer Emulsion A). This combination corresponds to 6.5 parts sodium silicate per 100 parts siloxane polymer. Polymer Emulsion A was anionically stabilized with about 1.1 weight percent based on the weight of polydimethylsiloxane of sodium lauryl sulfate and contained about 0.7 percent based on the weight of polydimethylsiloxane of dodecylbenzenesulfonic acid. To a 107 g portion of the sodium silicate and polydimethylsiloxane emulsion, there was added 1 g of an emulsion containing 50 weight percent dioctyltin dilaurate, 9 weight percent of a sodium alkylarylpolyether sulfonate and 41 weight percent water (Tin Emulsion A). The resulting emulsion had a pH of 11.2.

Films were prepared from this emulsion one week after its preparation and again two months after its preparation. The films were prepared by spreading silicone emulsion on a Teflon® surface and allowing the water to evaporate at room temperature. Both films were elastomeric with the first having a tensile strength at break of 214 KPa (31 psi), elongation at break of 1200 percent and a modulus at 100 percent elongation of about 76 KPa and the second having a corresponding tensile strength of 365 KPa, elongation of 750 percent and modulus of about 117 KPa.

Films prepared less than 24 hours after preparation of the emulsion did not yield cured elastomeric products when the water evaporated.

EXAMPLE 2

A silicone emulsion was prepared by adding 8 g of aqueous sodium silicate solution having a weight ratio of $SiO_2/Na_2O$ of 3.22 and having 37.6 weight percent solids (Sodium Silicate B) to 200 g of Polymer Emulsion A as described in Example 1. Then 1 g of Tin Emulsion A and 143 g of an aqueous slurry of 70% by weight calcium carbonate having a particle size in the range of 1 to 10 μm was added to the emulsion. Finally, 4 g of a commercial aqueous solution of 28% polyacrylate was added as a thickener. The emulsion system had a pH of 10.6.

Films were prepared from this emulsion 12 days after its preparation by spreading the emulsion on a polyethylene surface and allowing the water to evaporate at room temperature. The films were elastomeric with an average tensile strength at break of 793 KPa and an average elongation at break of 617 percent.

To determine the stability of the emulsion at elevated temperatures, a portion of the emulsion was maintained at 50° C. for 7 days. Films prepared from the heat aged emulsion had a corresponding tensile strength of 804 KPa and an elongation of 562 percent indicating excellent stability.

EXAMPLE 3

A silicone emulsion was prepared by adding 8 g of Sodium Silicate B to 200 g. of Polymer Emulsion A. Then 2 g of Tin Emulsion A and 75 g of calcined alumina filler were mixed into the emulsion by stirring. The emulsion had a pH of 11.0.

Films were prepared from this emulsion at various times after its preparation by the same procedure as employed in Example 2. Films prepared after 3 days began to show signs of cure and films prepared after 8 days had an average tensile strength at break of 724 KPa and an elongation at break of 920 percent.

EXAMPLE 4

This example shows the effect of a diorganotindicarboxylate on the rate of graft copolymer formation in an anionically stabilized emulsion of hydroxyl endblocked polydiorganosiloxane containing sodium silicate.

A mixture of low molecular weight hydroxyl endblocked polydimethylsiloxanes (average degree of polymerization about 27) was emulsion polymerized by dispersing 1000 g of the siloxanes in 1034 g of water using 13.9 g of sodium lauryl sulfate as the surfactant and 11.1 g of dodecylbenzene sulfonic acid as the polymerization catalyst. The polymerization was allowed to proceed to equilibrium at 22° C. (~2 days) at which time 2 percent aqueous NaOH was added to the emulsion until the pH reached 10. The emulsion contained 48 percent by weight solids.

Sufficient Sodium Silicate A was then added to the emulsion to provide 2.0 parts by weight sodium silicate solids per 100 parts by weight siloxane polymer. To a portion of this emulsion was added 0.58 g of dioctyltindilaurate. The gel contents of the emulsion with and without the tin compound were periodically determined by evaporating the water from the emulsion at room temperature and determining the fraction of the deposited polydimethylsiloxane that was insoluble in heptane. The results are shown in Table 1.

TABLE 1

| Emulsion | Gel Content of Deposited Siloxane After the Indicated Days of Aging | | | | |
|---|---|---|---|---|---|
| | 1 | 2 | 3 | 7 | 50 |
| With Dioctyltindilaurate | 8 | 12.8 | 91.1 | 91.4 | 94.3 |
| Without Dioctyltindilaurate | 7.5 | 7.8 | 8.5 | 9.2 | 8.6 |

EXAMPLE 5

A silicone emulsion was prepared as in Example 1, except that 3.0 parts of Sodium Silicate A per 100 parts of siloxane polymer was employed. The resulting emulsion had a pH of 10.8. The pH was adjusted to 10.1 with ion exchange resin.

Films were prepared as in Example 1, one week and again two months after the preparation of the emulsion. Both films were elastomeric with the first having a tensile strength at break of 352 KPa, elongation at break of 1100 percent and a modulus at 100 percent elongation of 110 KPa. The latter film had a corresponding tensile strength of 310 KPa, elongation of 690 percent and modulus of 117 KPa. The latter film had a gel (insoluble fraction) content after 24 hours in cyclohexane of 87 percent and a swell of 1600 percent.

In order to assess the degree of crosslinking in the siloxane emulsion particles prior to the film formation by evaporation of water, the siloxane emulsion particles were quickly removed from the emulsion by rapid freezing and by precipitation with isopropanol or 5% sodium nitrate solution. The gel content and swell data for the silicone separated from the emulsion 2 months after its preparation is given in Table 2.

TABLE 2

| Method of Separation From Emulsion | % Gel (Cyclohexane) | % Swell in Cyclohexane |
|---|---|---|
| Freezing | 88 | 1700 |
| Precipitate With Isopropanol | 95 | 1700 |
| Precipitate With Sodium Nitrate (5%) | 97 | Not Determined |

EXAMPLE 6

This example illustrates the reduced stability of emulsions containing sodium silicate when the pH of the system is decreased.

A silicone emulsion was prepared by adding 6.36 g of Sodium Silicate A and 0.5 g of Tin Emulsion A to 100 g of an aqueous emulsion containing about 50 weight percent emulsion polymerized hydroxyl endblocked polydimethylsiloxane having a weight average molecular weight of about 200,000. The emulsion was carefully acidified by incremental additions of 5N HCl with continuous stirring. When the pH fell below 6.5, the emulsion immediately became extremely thick and non-pourable. After 4 days aging, a layer of the emulsion was spread out and allowed to dry overnight. The film formed was not significantly crosslinked.

That which is claimed is:

1. An aqueous silicone emulsion comprising a continuous water phase and a dispersed silicone phase free of colloidal silica prepared by (A) adding alkali metal silicate to anionically stabilized aqueous emulsion of hydroxyl endblocked polydiorganosiloxane, (B) adjusting the pH of the emulsion within the range from 8.5 to 12 inclusive, and (C) then aging the emulsion at the pH of 8.5 to 12 for a time period such that an elastomeric product is formed upon removal of the water under ambient conditions.

2. The silicone emulsion according to claim 1 in which the polydiorganosiloxane is a polydimethylsiloxane.

3. The silicone emulsion according to claim 2 in which the alkali metal silicate is a sodium silicate and is employed in an amount of from 0.3 to 30 parts by weight per each 100 parts by weight polydimethylsiloxane.

4. The silicone emulsion according to claim 3 in which the polydimethylsiloxane employed has a weight average molecular weight of 200,000 to 700,000.

5. The silicone emulsion according to claim 4 in which there is also present an organic tin salt.

6. The silicone emulsion according to claim 5 in which the organic tin salt is a diorganotindicarboxylate and is present in an amount of from 0.1 to 2 parts by weight for each 100 parts by weight polydimethylsiloxane.

7. The silicone emulsion according to claim 6 in which there is also present a filler.

8. The silicone emulsion according to claim 4 in which the hydroxyl endblocked polydimethylsiloxane is an anionic emulsion polymerized polydimethylsiloxane.

9. An aqueous silicone emulsion which provides an elastomeric product upon removal of the water under ambient conditions comprising a continuous water phase and an anionically stabilized dispersed silicone phase free of colloidal silica, the silicone phase comprising a graft copolymer of alkali metal silicate and a hydroxyl endblocked polydiorganosiloxane, the silicone emulsion having a pH within the range from 8.5 to 12 inclusive.

10. The silicone emulsion according to claim 9 in which the polydiorganosiloxane is an anionic emulsion polymerized polydimethylsiloxane having a weight average molecular weight of 200,000 to 700,000.

11. The silicone emulsion according to claim 10 in which the alkali metal silicate is a sodium silicate and is employed in an amount of from 0.3 to 30 parts by weight for each 100 parts by weight polydimethylsiloxane.

12. The silicone emulsion according to claim 11 in which a diorganotindicarboxylate is present in an amount of from 0.1 to 2 parts by weight for each 100 parts by weight polydimethylsiloxane.

13. The silicone emulsion according to claims 6 or 12 in which the emulsion has a pH within the range from 10 to 12.

14. The silicone emulsion according to claim 13 in which there is also present a filler.

15. A method of preparing an aqueous silicone emulsion comprising (A) adding alkali metal silicate free of colloidal silica to an anionically stabilized aqueous emulsion of hydroxyl endblocked polydiorganosiloxane, (B) adjusting the pH of the emulsion within the range from 8.5 to 12 inclusive, and (C) then aging the emulsion at the pH of 8.5 to 12 for a time period such that an elastomeric product is formed upon removal of the water under ambient conditions.

16. The method according to claim 15 in which the emulsion of polydiorganosiloxane is prepared by anionic emulsion polymerization of a siloxane selected from the group consisting of polydiorganosiloxane cyclics and hydroxyl endblocked polydiorganosiloxane oligomers.

17. The method according to claim 15 additionally comprising adding an organic tin salt to the emulsion.

18. The silicone emulsion according to claim 1 in which the combined amount of silicate and polydiorganosiloxane employed is 67 to 160 parts by weight for each 100 parts by weight of water.

19. The silicone emulsion according to claim 9 in which the graft copolymer is employed in an amount of from 67 to 160 parts by weight for each 100 parts by weight water.

* * * * *